United States Patent
He et al.

(10) Patent No.: US 7,116,517 B1
(45) Date of Patent: Oct. 3, 2006

(54) STITCHED POLE WRITE ELEMENT WITH A T-SHAPED POLE TIP PORTION

(75) Inventors: Qing He, Fremont, CA (US); Hirohiko Kamimura, Cupertino, CA (US); Shuhei Otani, Fremont, CA (US); Yugang Wang, Milpitas, CA (US); David J. Seagle, Morgan Hill, CA (US)

(73) Assignee: Western Digital (Fremont), Inc., Fremont, CA (US)

( * ) Notice: Subject to any disclaimer, the term of this patent is extended or adjusted under 35 U.S.C. 154(b) by 41 days.

(21) Appl. No.: 10/323,128

(22) Filed: Dec. 18, 2002

(51) Int. Cl.
*G11B 5/147* (2006.01)

(52) U.S. Cl. .................................................. 360/126

(58) Field of Classification Search ............... 360/126, 360/317
See application file for complete search history.

(56) References Cited

U.S. PATENT DOCUMENTS

| | | | | |
|---|---|---|---|---|
| 5,198,950 A | * | 3/1993 | Wada et al. ................. 360/126 |
| 5,208,715 A | * | 5/1993 | Mowry ........................ 360/319 |
| 5,600,519 A | * | 2/1997 | Heim et al. ................. 360/126 |
| 5,801,910 A | * | 9/1998 | Mallary ....................... 360/126 |
| 5,805,391 A | * | 9/1998 | Chang et al. ................ 360/317 |
| 6,055,137 A | * | 4/2000 | Ishiwata et al. ............. 360/317 |

* cited by examiner

*Primary Examiner*—David Davis
(74) *Attorney, Agent, or Firm*—Carr & Ferrell LLP; Joshua C. Harrison, Esq.

(57) ABSTRACT

A T-shaped pole tip portion of an upper pole of a write element for a magnetic disk drive is provided. One end of the pole tip portion, constituting the bottom of the "T," forms a narrow nose segment at an air bearing surface, while a wing segment at the opposite end of the pole tip portion constitutes the cross-bar top of the "T." A transition segment extends between the nose segment and the wing segment. A yoke portion of the upper pole includes a surface that is parallel to the air bearing surface and recessed therefrom by a P3R depth. The transition segment does not widen significantly until after the P3R depth, accordingly, the wing segment is recessed from the air bearing surface by more than the P3R depth.

19 Claims, 5 Drawing Sheets

STITCHED POLE WRITE ELEMENT WITH A T-SHAPED POLE TIP PORTION

BACKGROUND OF THE INVENTION

1. Field of the Invention

The present invention relates generally to the field of magnetic disk drives, and more particularly to an apparatus for writing data to a magnetic disk.

2. Description of the Prior Art

Figure 1:
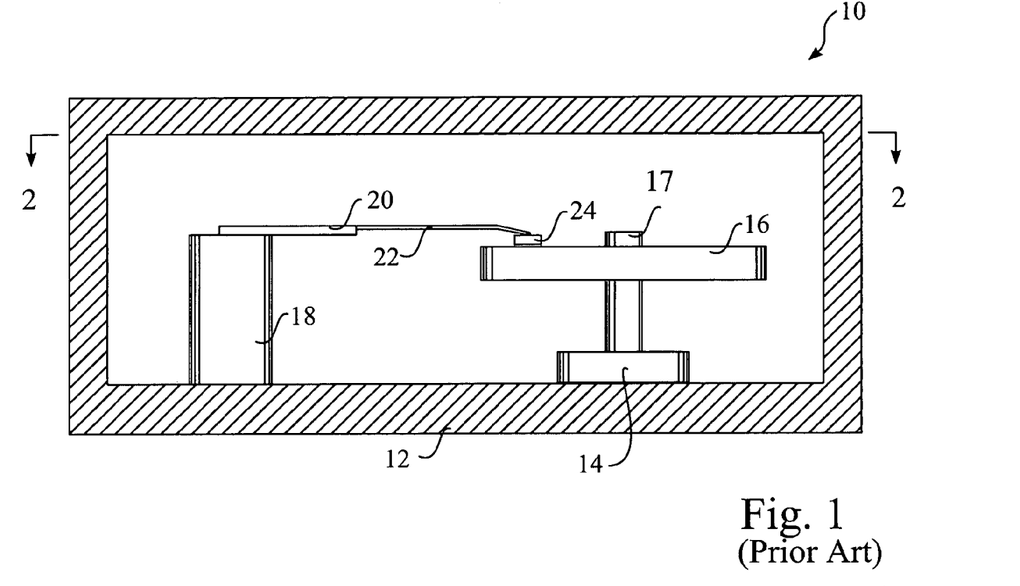
FIG. 1 is a partial cross-sectional view of a magnetic data storage system according to the prior art.
Figure 2:
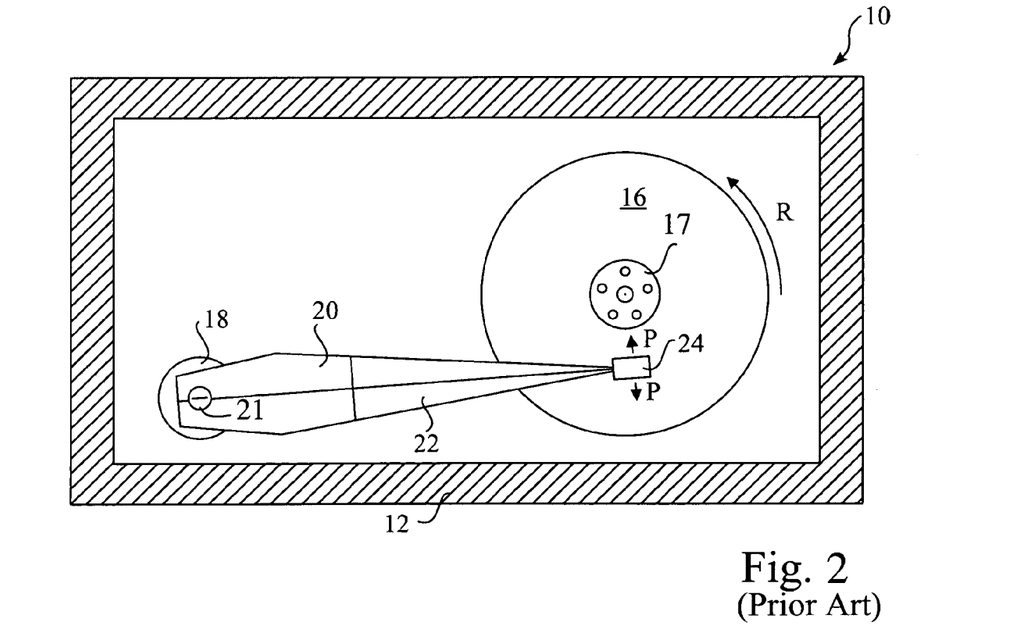
FIG. 2 is a partial cross-sectional view taken along line 2—2 of FIG. 1.

Magnetic disk drives are used to store and retrieve data for digital electronic apparatuses such as computers. In FIGS. 1 and 2, a magnetic disk data storage system 10 includes a sealed enclosure 12, a disk drive motor 14, and a magnetic disk, or media, 16 supported for rotation by a drive spindle 17 of motor 14. Also included are an actuator 18 and an arm 20 attached to an actuator spindle 21 of actuator 18. A suspension 22 is coupled at one end to the arm 20 and at another end to a read/write head 24. The suspension 22 and the read/write head 24 are commonly collectively referred to as a head gimbal assembly (HGA). The read/write head 24 typically includes an inductive write element and a magnetoresistive read element that are held in a very close proximity to the magnetic disk 16. As the motor 14 rotates the magnetic disk 16, as indicated by the arrow R, an air bearing is formed under the read/write head 24 causing the read/write head to lift slightly off of the surface of the magnetic disk 16, or, as it is commonly termed in the art, to "fly" above the magnetic disk 16. Data bits can be written or read along a magnetic "track" of the magnetic disk 16 as the magnetic disk 16 rotates past the read/write head 24. The actuator 18 translates the read/write head 24 from one magnetic track to another by pivoting the arm 20 and the suspension 22 in an arc indicated by arrows P. The design of magnetic disk data storage system 10 is well known to those skilled in the art.

Figure 3:
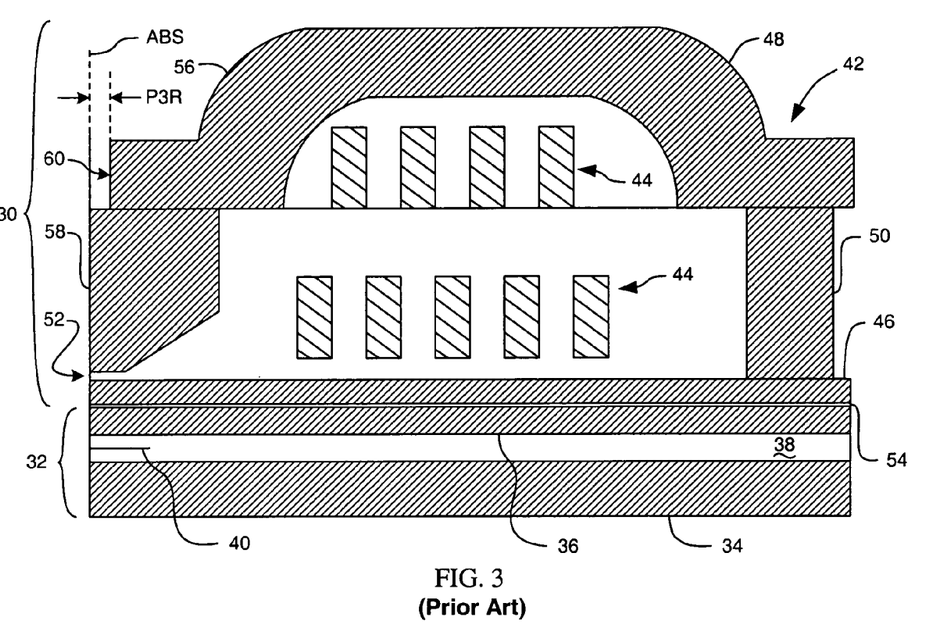
FIG. 3 is a cross-sectional view of a read/write head of the prior art.

FIG. 3 shows a cross-sectional view of a read/write head. The read/write head includes a write element 30 for writing data bits to a magnetic disk and a read element 32 for reading the data bits. The read element 32 includes a first shield 34, a second shield 36, a read insulation layer 38 disposed between the first shield 34 and the second shield 36, and a read sensor 40 disposed within the read insulation layer 38 and exposed at an air bearing surface (ABS). The read sensor 40 can be, for example, a magnetoresistive sensor such as a giant magnetoresistive (GMR) device or an anisotropic magnetoresistive (AMR) device.

The write element 30 includes a yoke 42 and one or more layers of electrically conductive coils 44 wound around the yoke 42. The yoke 42 includes a lower pole 46 connected to an upper pole 48 by a back gap 50 at a back gap end. The lower and upper poles 46, 48 oppose each other across a write gap 52 at an air bearing end. In some designs, often referred to as "merged head" designs, second shield 36 and lower pole 46 are the same layer. In other designs, such as the one shown in FIG. 3, a thin insulating layer 54 separates the second shield 36 from the lower pole 46. In operation, an electric current is passed through the coils 44 to induce a magnetic field in the yoke 42. As the induced magnetic field bridges the write gap 52, lines of magnetic flux arch outward across the ABS and intersect the nearby magnetic disk (not shown). Bits of data are written where the lines of magnetic flux intersect the magnetic disk.

In a stitched pole design for a write element 30, the upper pole 48 includes a yoke portion 56 coupled to a pole tip portion 58. The yoke portion 56, sometimes referred to as a third pole or "P3," extends between the back gap 50 and the pole tip portion 58, sometimes referred to as a second pole or "P2." The yoke portion 56 typically does not extend all of the way to the ABS. Instead, an insulating material (not shown) fills the space between the ABS and an opposing face 60 of the yoke portion 56. The opposing face 60 of the yoke portion 56 is recessed from the ABS by a distance, P3R. Recessing the opposing face 60 from the ABS helps to prevent magnetic flux from escaping from the opposing face 60 and bridging the distance to the magnetic disk which can corrupt existing data bits. Since the amount of magnetic flux reaching the magnetic disk from the opposing face 60 decreases as a function of P3R, designers seeks to make P3R at least large enough that the amount of magnetic flux reaching the magnetic disk from the opposing face 60 is less than some acceptable threshold.

Figure 4:
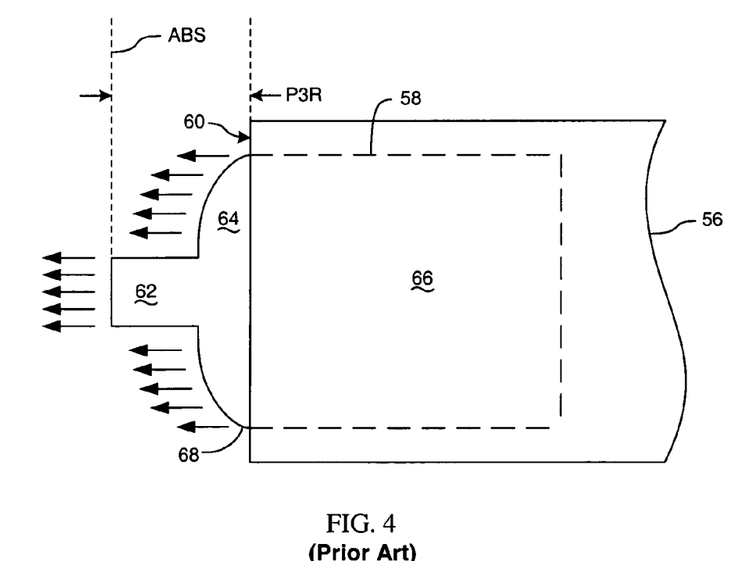
FIG. 4 is a top plan view of a yoke portion and a pole tip portion of the read/write head in FIG. 3.

FIG. 4 shows a plan view of the yoke portion 56 and the pole tip portion 58 of the write element 30 of FIG. 3 as viewed from above. The pole tip portion 58 includes a narrow nose segment 62 to restrict the magnetic flux (shown as a set of arrows) to a narrow area at the ABS. The pole tip portion 58 widens behind the nose segment 62 into a broad segment 64 that connects with the yoke portion 56 over a stitched area 66 through which magnetic flux can pass between the yoke portion 56 and the pole tip portion 58. The stitched area 66 is preferably maximized to maximize the amount of magnetic flux available at the nose segment 62 to write bits to the magnetic disk. The stitched area 66 is maximized by designing pole tip portion 58 such that the broad segment 64 reaches its full width at, or in front of, P3R.

It can also be seen from FIG. 4 that magnetic flux can also leak from portions 68 of the broad segment 64 around the nose segment 62 that are closer to the ABS than P3R. This magnetic flux leakage creates an undesirable effect commonly known as "side writing." In essence, side writing is the tendency of the write element to influence the magnetic disk on either side of the track to which it is writing. Like magnetic flux leakage from the opposing face 60, described above, side writing is deleterious because it can corrupt adjacent tracks. To alleviate problems of side writing, successive tracks must be written further apart, thus lowering the data density of the magnetic disk.

Accordingly, what is needed is a design for a pole tip portion of an upper pole that can allow more magnetic flux to reach the ABS while at the same time reducing magnetic flux leakage from around the nose segment.

SUMMARY

A magnetic disk data storage system comprises a rotatable magnetic disk and an actuator configured to translate a head gimbal assembly including a read/write head relative to the magnetic disk. The read/write head includes a read element and a write element. The write element includes a lower, or first, pole and a write gap layer disposed above the lower pole. In some embodiments the write element also includes an insulation layer disposed above the write gap layer with a tapered portion that comes to a point at a zero throat depth from an air bearing surface (ABS). The write element also includes an upper pole coupled to the lower pole. The upper pole includes a yoke portion that has a surface parallel to the ABS and recessed from the ABS by a P3R depth. The upper pole also includes a T-shaped pole tip portion disposed between the yoke portion and the write gap layer.

The pole tip portion includes three segments that define the T-shape; a nose segment, a wing segment, and a transition segment disposed between the nose and wing segments.

The nose segment has a first width defined between two sidewalls that in some embodiments are substantially parallel. The nose segment has a nose length that in some embodiments is less than the zero throat depth.

The wing segment is recessed from the air bearing surface by more than the P3R depth and in some embodiments the wing segment begins at a depth greater than the zero throat depth. The wing segment has a second width, greater than the first width, also defined between two sidewalls. In some embodiments the sidewalls of the wing segment are substantially parallel, while in other embodiments the sidewalls diverge from one another such that the second width increases with depth from the air bearing surface.

The transition segment has a first end joined to the nose segment, a second end joined to the wing segment, and a variable third width that is less than the second width of the wing segment. The third width, as measured at the second end, is greater than the first width of the nose segment. The third width, in some embodiments, increases to an intermediate value and then remains substantially equal to the intermediate value as a function of depth from the air bearing surface. In other embodiments the third width increases in a substantially linear relationship as a function of depth from the air bearing surface.

The lower and upper poles are formed of ferromagnetic materials. In some embodiments the nose segment of the pole tip portion of the upper pole includes more than one layer of ferromagnetic material. In some of these embodiments the nose segment includes a seed layer of a material with a first saturation magnetization, a middle layer above the seed layer formed of a material with a second saturation magnetization, and a cap layer above the middle layer formed of a material with a third saturation magnetization. In some of these embodiments the first saturation magnetization is greater than the second saturation magnetization, and the second saturation magnetization is greater than the third saturation magnetization.

DETAILED DESCRIPTION OF THE INVENTION

The present invention provides an improved design for a pole tip portion of an upper pole of a stitched pole write element. The improved pole tip portion is T-shaped such that the bottom of the "T" forms a narrow nose segment at the ABS, while the cross-bar top of the "T," termed a wing segment, provides a greater stitched area between the pole tip portion and the yoke portion. A transition segment extends between the nose segment and the wing segment. The T-shaped pole tip portion does not widen significantly until after a distance, P3R, to minimize side writing.

Figure 5A:
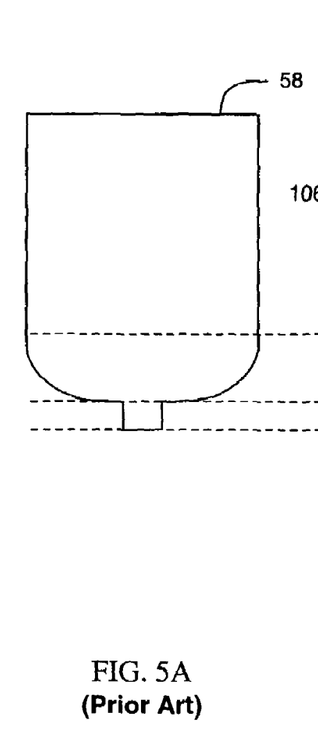
FIG. 5A is a plan view of a pole tip portion of the prior art.
Figure 5B:
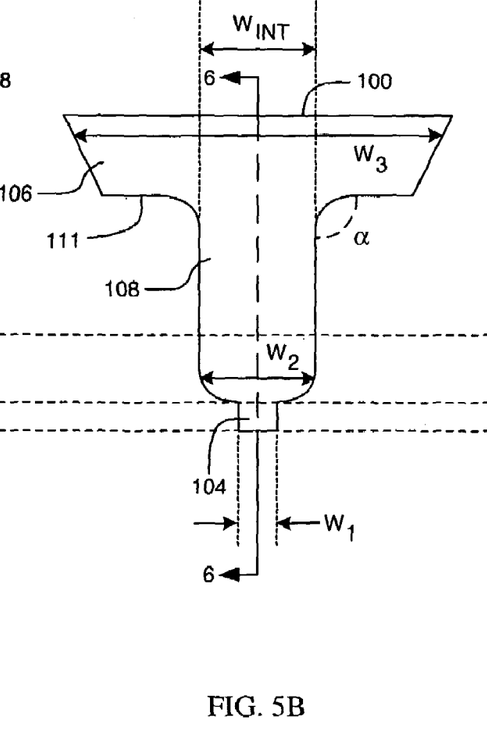
FIG. 5B is a plan view of an exemplary pole tip portion according to an embodiment of the invention.
Figure 5C:
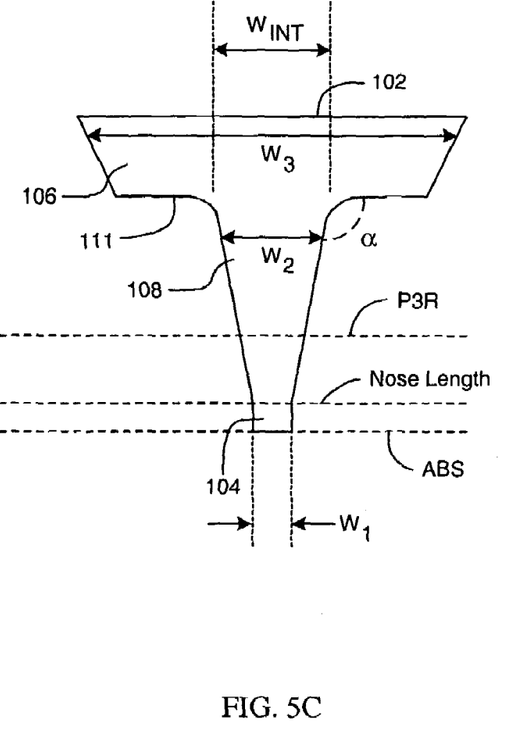
FIG. 5C is a plan view of another exemplary pole tip portion according to another embodiment of the invention.

FIG. 5A shows a pole tip portion 58 of the prior art compared to two exemplary pole tip portions 100, 102 of the invention (FIGS. 5B and 5C). Each exemplary pole tip portion 100, 102 includes a nose segment 104, a wing segment 106, and a transition segment 108 between the nose and wing segments 104, 106. It can be seen from FIGS. 5B and 5C that the nose segment 104 extends from the ABS to a depth termed the "nose length" which is less than the recess depth of the yoke portion, P3R. Further, the transition segment 108 crosses P3R, and the wing segment 106 is completely recessed behind P3R.

The nose segment 104 is exposed at the ABS and includes two sidewalls that extend from the ABS to the nose length. The distance between the two nose segment sidewalls defines a first width, $W_1$. In some embodiments the sidewalls are substantially parallel, as shown.

Transition segment 108 includes a first end joined to the nose segment 104 and a second end joined to the wing segment 106. Transition segment 108 also includes two sidewalls extending from the nose segment 104 to the wing segment 106. A second width, $W_2$, of the transition segment 108 is defined between the two sidewalls of the transition segment 108. Since the transition segment 108 broadens from the nose segment 104 to the wing segment 106, the second width, $W_2$, is variable. In all embodiments, $W_2$ is substantially equal to $W_1$ where the transition segment 108 joins the nose segment 104. The width, $W_2$, increases as the transition segment 108 extends in a direction away from the ABS and towards the wing segment 106. In some embodiments, such as the exemplary embodiment in FIG. 5B, the width, $W_2$, of the transition segment 108 increases rapidly to an intermediate width, $W_{INT}$, and then remains substantially equal to the intermediate width until joining with the wing segment 106. In other embodiments, such as the exemplary embodiment in FIG. 5C, the width, $W_2$, increases in a substantially linear relationship as a function of depth from the ABS. In these embodiments $W_2$ is substantially equal to $W_1$ at the nose segment 104, is substantially equal to $W_{INT}$ at the wing segment 106, and varies uniformly between the two segments 104, 106.

Wing segment 106 also includes two sidewalls that define a third width, W3, therebetween. In some embodiments the sidewalls of the wing segment 106 are substantially parallel and W3 is constant across the depth of the wing segment 106. In other embodiments, such as the exemplary embodiments shown in FIGS. 5B and 5C, the sidewalls diverge from one another and, accordingly, W3 is variable and increases with depth from the ABS. Since the wing segment 106 is intended to provide additional stitched area, the third width, W3, is greater than the first width, W1. The wing segment 106 also includes a leading edge 111 that is recessed from the air bearing surface by more than the P3R depth. In some embodiments, the leading edge 111 includes a portion that is substantially parallel to the air bearing surface.

Further, an interior angle, α, is defined between the transition segment 108 and the wing segment 106.

Figure 6:
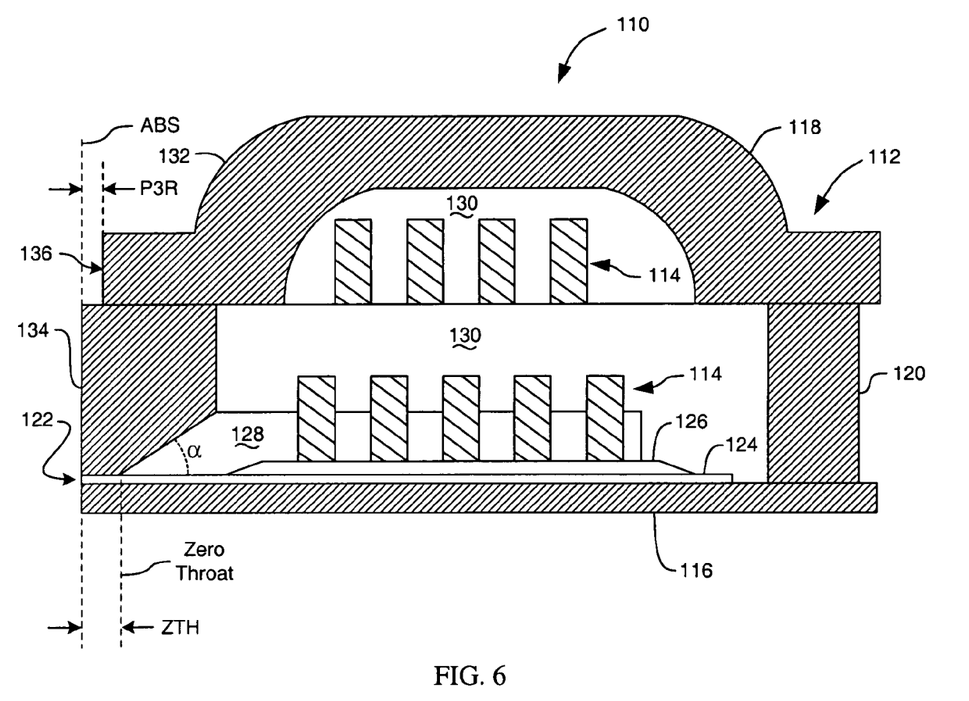
FIG. 6 is a cross-sectional view of an exemplary write element according to an embodiment of the invention.

FIG. 6 shows a cross-sectional view of an exemplary write element 110 of the invention. The write element 110 includes a yoke 112 and one or more layers of electrically conductive coils 114 wound around the yoke 112. The yoke 112 includes a lower pole 116 connected to an upper pole 118 by a back gap 120 at a back gap end. The lower and upper poles 116, 118 oppose each other across a write gap 122 at an air bearing end.

A write gap layer 124 fills the write gap and in some embodiments extends over the lower pole 116 towards the back gap 120 to insulate coil 114 from the lower pole 116, as shown. In some embodiments the thinness of the write gap layer 124 makes it desirable to include a second insulation layer 126 between coil 114 and the lower pole 116. In some embodiments a third insulation layer 128 disposed over the write gap layer 124 tapers towards the air bearing end of the yoke 112 to define an apex angle, α, and can also serve to at least partially insulate successive turns of coil 114. A fourth insulation layer 130 fills in the remaining space between the yoke 42 and the coil 114. The write gap layer 124 and the second insulation layer 126 are typically formed of inorganic materials such as alumina ($Al_2O_3$), while the third and fourth insulation layers 128, 130 are typically formed of organic materials such as cured photoresist.

The upper pole 118 includes a yoke portion 132 stitched to a pole tip portion 134, of which pole tip portions 100 and 102 in FIGS. 5B and 5C are but two exemplary embodiments. The yoke portion 132 extends between the back gap 120 and the pole tip portion 134. The yoke portion 132 does not extend all of the way to an ABS. Instead, an insulating material (not shown) fills the space between the ABS and an opposing face 136 of the yoke portion 132. The opposing face 136 of the yoke portion 132 is recessed from the ABS by a distance, P3R.

The pole tip portion 134 shown in FIG. 6 is a cross-section, such as taken from the perspective of line 6—6 in FIG. 5B, or a similar perspective in FIG. 5C, of an exemplary pole tip portion of the invention. The point at which the apex angle is defined is commonly referred to as the "zero throat" and defines a depth behind the ABS commonly referred to as the "zero throat height" or ZTH. The length of a nose segment of the pole tip portion 134, the nose length in FIGS. 5A–5C, is in some embodiments less than ZTH, and in some embodiments a wing segment of the pole tip portion 134 begins at a depth greater than ZTH.

The nose segment 104 (FIGS. 5B and 5C) of the pole tip portion 134 includes a bottom surface that in some embodiments is substantially planar and forms the upper boundary of the write gap 122. A top surface of the nose segment 104 is also substantially planar and substantially parallels the bottom surface.

A top surface of the transition segment 108 (FIGS. 5B and 5C) of the pole tip portion 134 is substantially planar and also coplanar with the top surface of the nose segment 104. A bottom surface of the transition segment 108 is coplanar with the bottom surface of the nose segment 104 between the nose segment 104 and the zero throat, and is then contiguous with the third insulating layer 128 between the zero throat and the wing segment 106 (FIGS. 5B and 5C). It should be noted that the tapered portion of the third insulating layer 128 is not limited to the triangular cross-section shown in FIG. 6, and in some embodiments the third insulating layer 128 in the tapered portion is curvalinear, for example, dome-shaped. In these embodiments, therefore, the bottom surface of the transition segment 108 between the zero throat and the wing segment 106 is concave to match the shape of the tapered portion of the third insulating layer 128.

Wing segment 106 (FIGS. 5B and 5C) of the pole tip portion 134 has a top surface that is also substantially planar and coplanar with the top surfaces of the nose and transition segments 104 and 108. A bottom surface of the wing segment 106 can also be contiguous with the third insulating layer 128. Although FIG. 6 shows the pole tip portion 134 extending only over the tapered portion of the third insulating layer 128, it will be appreciated that the invention is not limited in this respect. Accordingly, the wing segment 106 can extend to the same depth as that of the tapered portion of the third insulating layer 128, as shown in FIG. 6, or the wing segment 106 can stop short of this depth or extend beyond this depth.

Figure 7A:
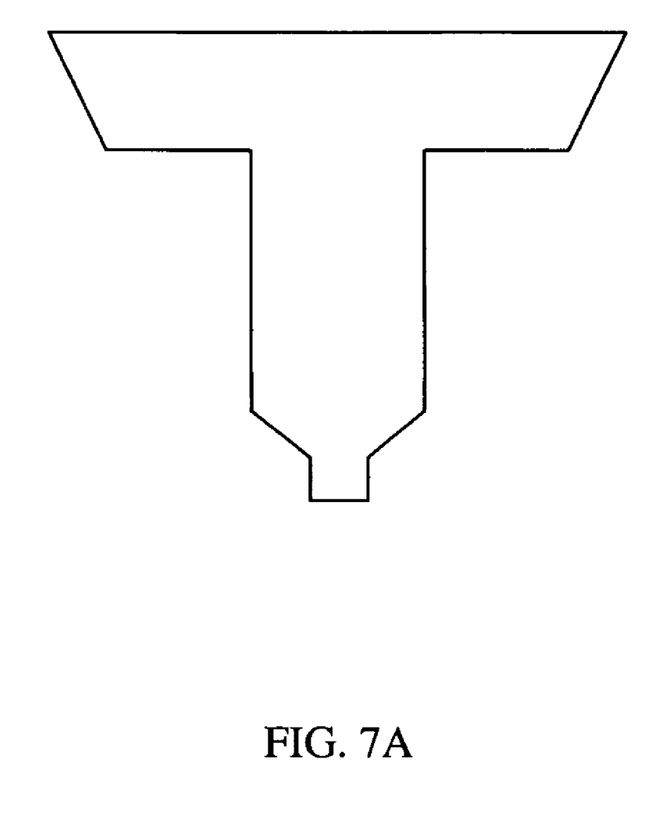
FIG. 7A is an exemplary mask design for fabricating a pole tip portion according to an embodiment of the invention.
Figure 7B:
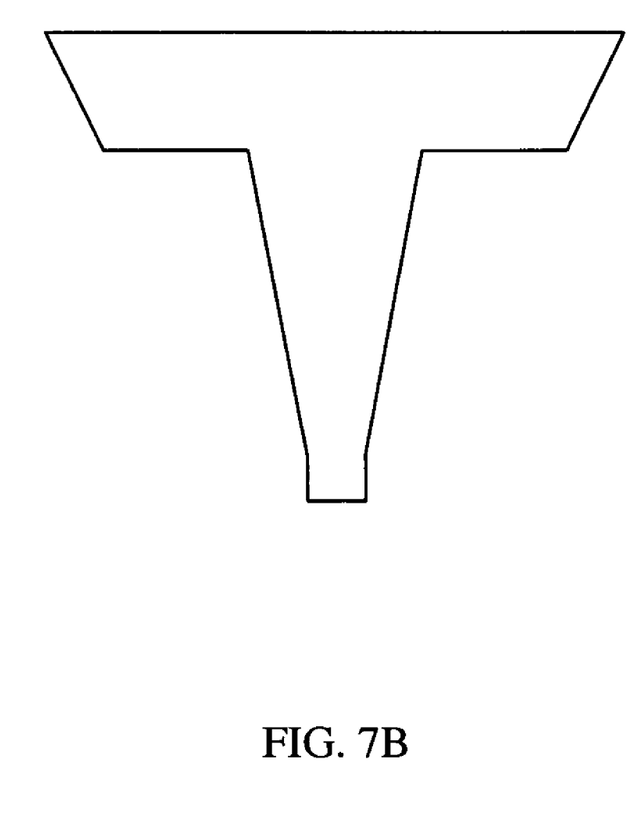
FIG. 7B is another exemplary mask design for fabricating a pole tip portion according to another embodiment of the invention.

The pole tip portion 134 can be formed, for example, by plating a ferromagnetic material over the write gap layer 124 and over the third insulation layer 128. Plating is preferably performed with a mold, or plating dam, that has substantially the shape of the intended pole tip portion 134. The plating dam can be formed of photoresist, for example, by standard photolithographic techniques. Exemplary mask designs for patterning photoresist to form such plating dams are shown in FIGS. 7A and 7B. It will be appreciated that a pole tip portion formed with either of the exemplary mask designs shown in FIGS. 7A and 7B will have, without further refinement, essentially the same shape as the mask. Such a pole tip portion is within the scope of the invention.

Further refinement to the shape of the pole tip portion can be performed to round deleterious sharp corners. Further refinement can take a pole tip portion produced with the mask in FIG. 7A, for example, and modify it until it has the shape of pole tip portion 100 in FIG. 5B. Similarly, a pole tip portion produced with the mask in FIG. 7B can be refined to have the shape of pole tip portion 102 in FIG. 5C. Further refinement can be achieved, for example, by ion milling by ion beam etching (IBE). Ion milling can round sharp corners not only in the plane of the drawing shown in FIGS. 5A–5C, but also perpendicular to that plane.

Once the shape of the pole tip portion 134 has been properly defined, insulating material can be formed around the pole tip portion 134. Thereafter, the pole tip portion 134 can be planarized, such as by chemical-mechanical polishing (CMP), to form a generally flat top surface over which the yoke portion 132 can be formed.

Figure 8:
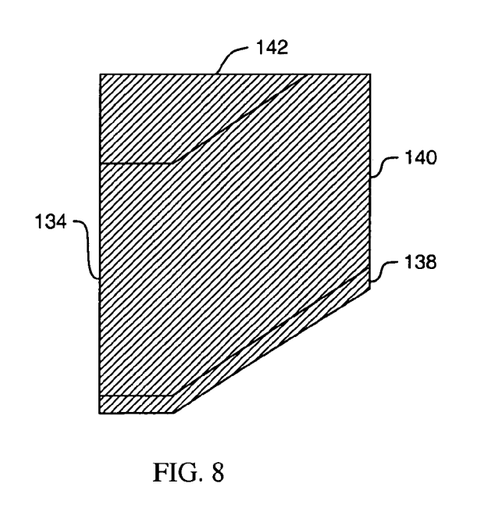
FIG. 8 is a cross-sectional view of an exemplary pole tip portion according to an embodiment of the invention.

In some embodiments the pole tip portion 134 is formed as a layered structure as shown in FIG. 8. The exemplary embodiment shown in FIG. 8 can be formed in a similar manner as described above. A seed layer 138 is first formed, for example, by depositing a ferromagnetic material over the write gap layer 124 and over the third insulation layer 128. The seed layer 138 can be formed by a vacuum deposition technique such as RF sputtering or ion beam deposition (IBD). The seed layer 138 is preferably formed of a material having a high saturation magnetization (e.g., a high $B_{sat}$ material) such as an alloy of CoNiFe.

Photolithography can then be used to form a plating dam over the seed layer 138. A middle layer 140 is then formed within the plating dam and over the seed layer 138 from a material having a high saturation magnetization, and in some embodiments the middle layer 140 is also formed of an alloy of CoNiFe. The middle layer 140 can be formed by a plating technique such as electroplating. In some embodiments the seed layer 138 and the middle layer 140 are both formed of the same material. In some of these embodiments the sputtered seed layer 138 has a higher saturation magnetization than the plated middle layer 140, the difference believed to be due to a slightly greater level of impurities in the plated middle layer 140. It will be appreciated that plating is preferred for fabricating the bulk of the pole tip portion because plating builds a layer of material to a requisite thickness much more quickly than vacuum deposition techniques, and that the seed layer 138 is provided primarily to assist the formation of the plated middle layer 140. However, one can also combine the middle layer 140 and the seed layer 138 into a single layer formed exclusively by either vacuum deposition or plating.

A cap layer 142 is formed over the middle layer 140 from a ferromagnetic material that preferably has a lower saturation magnetization than the middle layer 140. In those embodiments that use a CoNiFe alloy for the middle layer 140, a suitable cap layer 142 can be made of a NiFe alloy such as 18% Permalloy. The cap layer 142 is also preferably formed by plating but can also be formed by vacuum deposition. Because saturation magnetization is a measure of a material's capacity to carry magnetic flux, it will be appreciated that the design in FIG. 8 can shape the magnetic field at the write gap by restricting the number of lines of magnetic flux that can cross a unit area of the cap layer 142 at the ABS compared to the middle and seed layers 140 and 138. It will be understood that while it is preferable to tailor the magnetic field at the write gap through the use of layers with different saturation magnetizations, it is not essential and in some embodiments the middle and cap layers 140 and 142 are combined into a single layer.

After the cap layer 142 is completed, the plating dam can be removed to allow for further processing. As above, the shape of the pole tip portion 134 can be refined by ion milling. Following any refinement of the shape, an insulating material can be formed around the pole tip portion 134. Thereafter, the pole tip portion 134 can be planarized, such as by chemical-mechanical polishing (CMP), to form a generally flat top surface to which the yoke portion 132 can be joined.

In the foregoing specification, the invention is described with reference to specific embodiments thereof, but those skilled in the art will recognize that the invention is not limited thereto. Various features and aspects of the above-described invention may be used individually or jointly. Further, the invention can be utilized in any number of environments and applications beyond those described herein without departing from the broader spirit and scope of the specification. The specification and drawings are, accordingly, to be regarded as illustrative rather than restrictive.

What is claimed is:

1. A write element comprising:
   a first pole;
   a write gap layer disposed above the first pole;
   a third pole coupled to the first pole and including a surface parallel to an air bearing surface and recessed therefrom by a P3R depth, and
   a second pole disposed between the third pole and the write gap layer and having
      a nose segment having a first width, wherein the nose segment includes more than one layer of ferromagnetic material,
      a recessed segment, entirely recessed from the air bearing surface by more than the P3R depth, and having a second width greater than the first width, and
      a transition segment having a variable third width disposed between the nose segment and the recessed segment, wherein the variable third width includes a P3R width measured at the P3R depth, the P3R width being less than the second width.

2. The write element of claim 1 wherein the nose segment includes two substantially parallel sidewalls.

3. The write element of claim 1 wherein the nose segment includes:
   a seed layer of a material with a first saturation magnetization;
   a middle layer of a material with a second saturation magnetization above the seed layer; and
   a cap layer of a material with a third saturation magnetization above the middle layer.

4. The write element of claim 3 wherein the first saturation magnetization is greater than the second saturation magnetization, and the second saturation magnetization is greater than the third saturation magnetization.

5. The write element of claim 1 wherein the recessed segment includes substantially parallel sidewalls.

6. The write element of claim 1 wherein the recessed segment includes sidewalls that diverge from one another such that the second width increases with depth from the air bearing surface.

7. The write element of claim 1 wherein the third width, as a function of depth from the air bearing surface, increases to an intermediate value and then remains substantially equal to the intermediate value.

8. The write element of claim 1 wherein the third width increases in a substantially linear relationship as a function of depth from the air bearing surface.

9. The write element of claim 1 wherein the transition segment extends between the nose segment and the recessed segment, and wherein the transition segment includes two sidewalls that are parallel along a portion of the transition segment and define an intermediate width therebetween that is greater than the first width of the nose segment and less than the second width of the recessed segment.

10. The write element of claim 1 wherein the transition segment extends between the nose segment and the recessed segment, and wherein the transition segment includes two sidewalls that diverge from the nose segment to the recessed segment.

11. The write element of claim 1 further comprising an insulation layer disposed above the write gap layer and including a tapered portion that comes to a point at a zero throat depth from the air bearing surface.

12. The write element of claim 11 wherein a nose length of the nose segment is less than the zero throat depth.

13. The write element of claim 11 wherein the recessed segment begins at a depth greater than the zero throat depth.

14. An upper pole for a write element of a magnetic recording head, the upper pole comprising:
   a yoke portion including a surface parallel to an air bearing surface and recessed therefrom by a P3R depth, and
   a pole tip portion disposed beneath and coupled to the yoke portion and having
      a nose segment having a first width, wherein the nose segment includes more than one layer of ferromagnetic material,
      a recessed segment, entirely recessed from the air bearing surface by more than the P3R depth, and having a second width greater than the first width, and
      a transition segment having a variable third width disposed between the nose segment and the recessed segment, wherein the variable third width includes a P3R width measured at the P3R depth, the P3R width being less than the second width.

15. The upper pole of claim 14 wherein an interior angle is defined between the transition segment and the recessed segment.

16. The upper pole of claim 14 wherein the recessed segment includes a leading edge having a portion that is substantially parallel to the air bearing surface.

17. A write element comprising:
   a lower pole;
   a write gap layer disposed above the lower pole;
   an upper pole including
      a yoke portion coupled to the lower pole, and
      a pole tip portion disposed between the yoke portion and the write gap layer and having
         a nose segment with a first width, wherein the nose segment includes more than one layer of ferromagnetic material,
         a transition segment having
            a first end joined to the nose segment, and
            a second end with a second width greater than the first width, and
         a recessed segment joined to the second end of the transition segment and having a third width greater than the second width,
         wherein the transition segment also has a P3R width measured at a P3R depth, the P3R width being less than the third width.

18. A read/write head for a magnetic disk drive, the read/write head comprising:
   a read element; and
   a write element including
      a first pole;
      a write gap layer disposed above the first pole;
      a third pole coupled to the first pole and including a surface parallel to an air bearing surface and recessed therefrom by a P3R depth, and
      a second pole disposed between the third pole and the write gap layer and having
         a nose segment having a first width, wherein the nose segment includes more than one layer of ferromagnetic material,
         a recessed segment, entirely recessed from the air bearing surface by more than the P3R depth, and having a second width greater than the first width, and
         a transition segment having a variable third width disposed between the nose segment and the recessed segment, wherein the variable third width includes a P3R width measured at the P3R depth, the P3R width being less than the second width.

19. A magnetic disk data storage system comprising:
   a rotatable magnetic disk;
   an actuator configured to translate a head gimbal assembly including a read/write head relative to the magnetic disk,
   the read/write head including
      a read element; and
      a write element having
         a first pole;
         a write gap layer disposed above the first pole;
         a third pole coupled to the first pole and including a surface parallel to an air bearing surface and recessed therefrom by a P3R depth, and
         a second pole disposed between the third pole and the write gap layer and having
            a nose segment having a first width, wherein the nose segment includes more than one layer of ferromagnetic material,
            a recessed segment, entirely recessed from the air bearing surface by more than the P3R depth, and having a second width greater than the first width, and
            a transition segment having a variable third width disposed between the nose segment and the recessed segment, wherein the variable third width includes a P3R width measured at the P3R depth, the P3R width being less than the second width.

* * * * *